(12) United States Patent
Chiba

(10) Patent No.: US 9,596,006 B2
(45) Date of Patent: Mar. 14, 2017

(54) INFORMATION PROCESSING APPARATUS AND POWER SUPPLY CONTROL METHOD

(71) Applicant: CANON KABUSHIKI KAISHA, Tokyo (JP)

(72) Inventor: Akihiro Chiba, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 14/303,023

(22) Filed: Jun. 12, 2014

(65) Prior Publication Data

US 2015/0001952 A1    Jan. 1, 2015

(30) Foreign Application Priority Data

Jun. 28, 2013    (JP) .................... 2013-137485

(51) Int. Cl.
*H04B 5/00*    (2006.01)

(52) U.S. Cl.
CPC ......... *H04B 5/0037* (2013.01); *H04B 5/0031* (2013.01)

(58) Field of Classification Search
CPC .................................................. H02J 5/005
USPC ................................................... 307/104
See application file for complete search history.

(56) References Cited

U.S. PATENT DOCUMENTS

2006/0184705 A1    8/2006   Nakajima

FOREIGN PATENT DOCUMENTS

JP    2006-229583 A    8/2006

*Primary Examiner* — Robert Deberadinis
(74) *Attorney, Agent, or Firm* — Fitzpatrick, Cella, Harper & Scinto

(57) ABSTRACT

An information processing apparatus includes a communication unit configured to perform short distance wireless communication and a power reception unit configured to receive wirelessly transmitted power. The information processing apparatus provides a user interface for prompting a user to designate a function which an external apparatus is to be instructed, via the communication unit, to execute, and controls power reception by the power reception unit based on the function designated through the user interface.

13 Claims, 19 Drawing Sheets

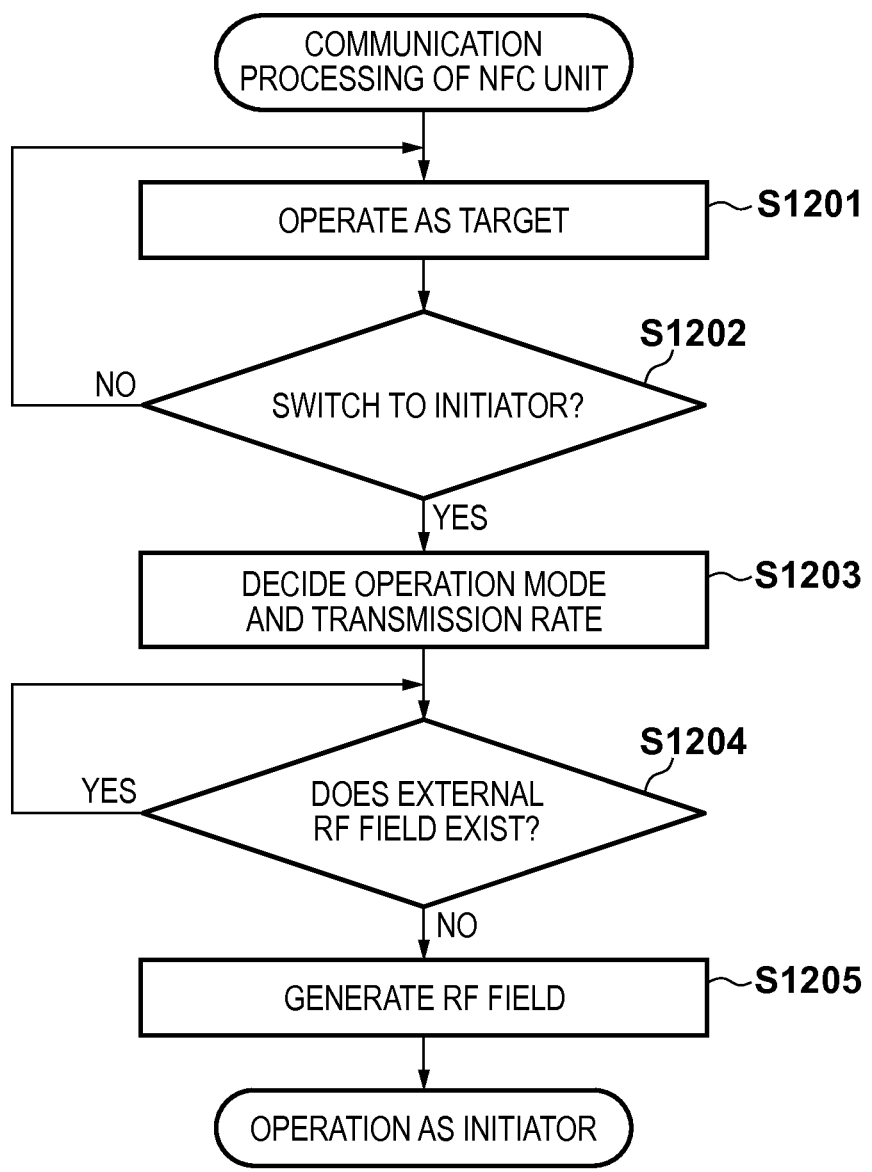

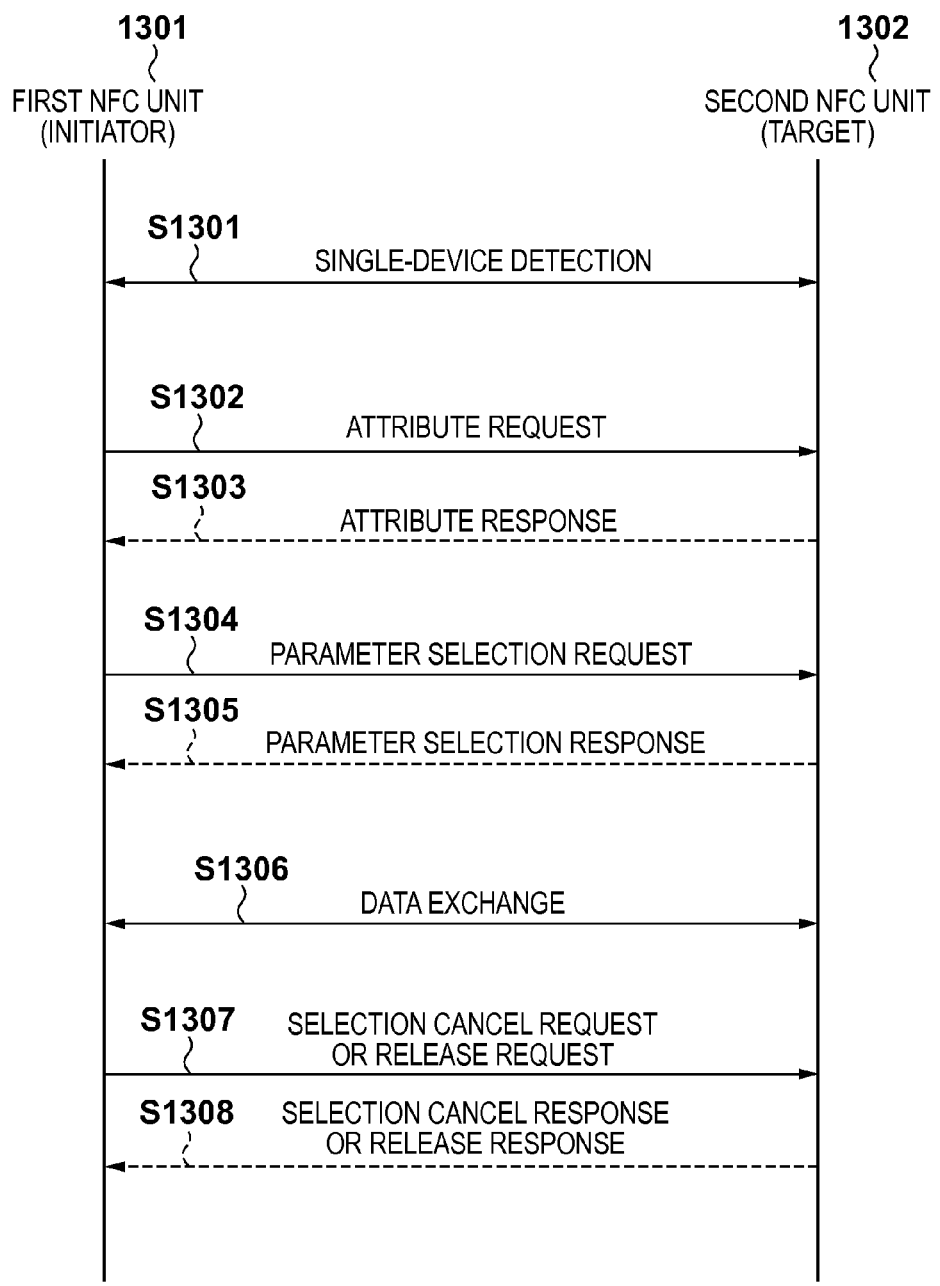

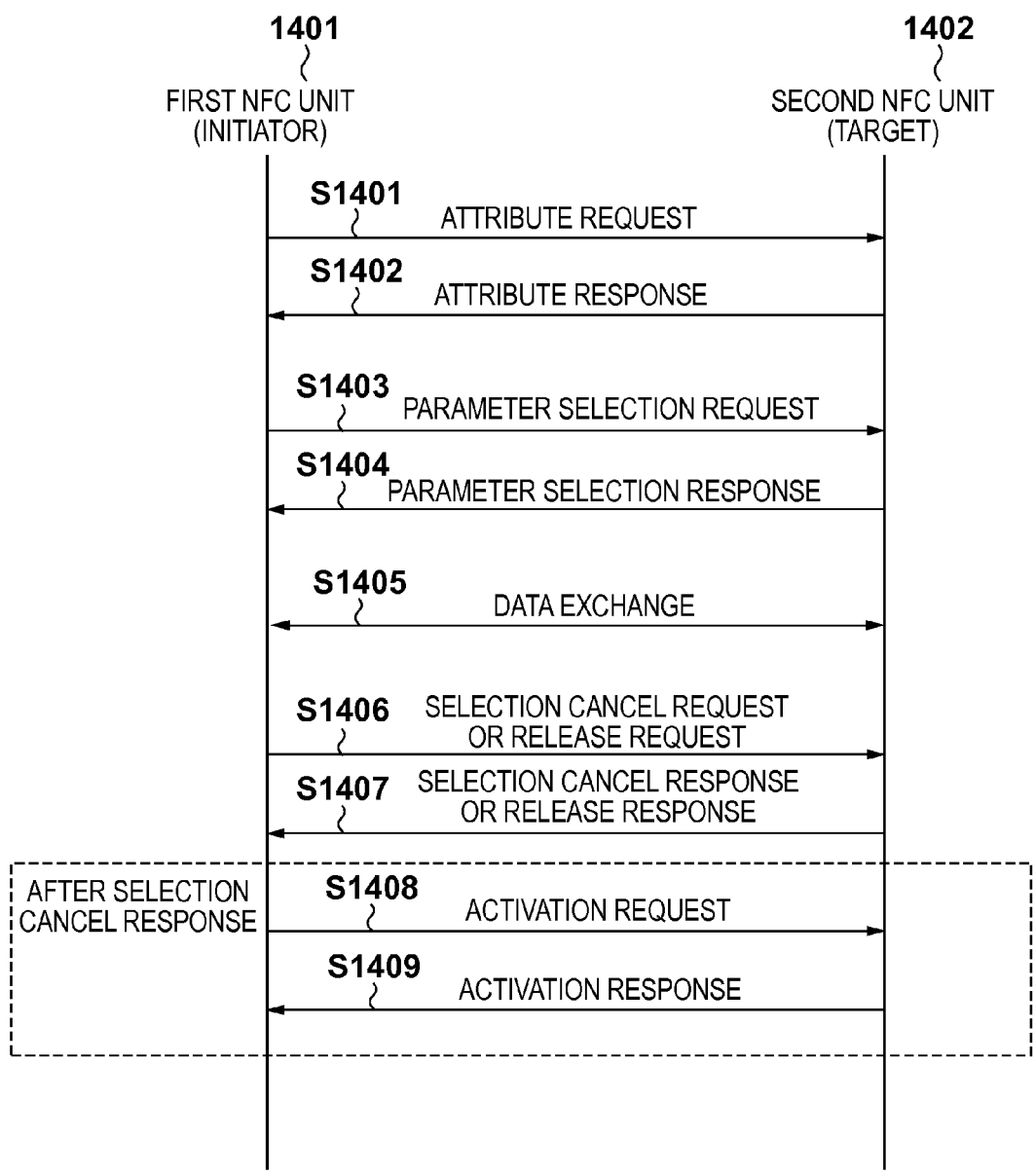

| NFC APPLICATION | WIRELESS POWER SUPPLY FUNCTION |
|---|---|
| FUNCTION A | DISABLE |
| FUNCTION B | DISABLE |
| FUNCTION C | ENABLE |
| FUNCTION D | ENABLE |

| SELECTED FUNCTION INFORMATION | WIRELESS POWER SUPPLY FUNCTION |
|---|---|
| FUNCTION A | DISABLE |
| FUNCTION B | DISABLE |
| FUNCTION C | ENABLE |
| FUNCTION D | ENABLE |

| NFC APPLICATION | WIRELESS POWER SUPPLY FUNCTION | | |
|---|---|---|---|
| FUNCTION A | DISABLE | | |
| FUNCTION B | ENABLE | | |
| FUNCTION C | ENABLE | | |
| FUNCTION D | ENABLE | ENABLE | DISABLE |

406

INFORMATION PROCESSING APPARATUS AND POWER SUPPLY CONTROL METHOD

BACKGROUND OF THE INVENTION

Field of the Invention

The present invention relates to an information processing apparatus having a short distance wireless communication function and a wireless power supply function, and a power supply control method for the information processing apparatus.

Description of the Related Art

In recent years, portable communication terminal apparatuses such as smartphones have rapidly prevailed. A portable communication terminal apparatus has a close proximity wireless communication function such as an NFC function, which allows transmission/reception of information by moving the apparatus closer to an external apparatus having an NFC function, resulting in very high convenience. One of problems imposed when using such portable communication terminal apparatus is battery consumption. For example, a smartphone is required to have a relatively small size because of its high convenience, and thus the capacity of an incorporated battery is limited. The battery may run out earlier than the user expected. As a measure against such problem, a wireless power supply system in which the battery of a smartphone can be charged by only placing the smartphone has been proposed. The wireless power supply system makes it possible to readily charge a smartphone without requiring the labor of the user.

If such wireless power supply function is included in a printing apparatus, it can be assumed that the compatibility between the smartphone and the printing apparatus becomes very high. For example, Japanese Patent Laid-Open No. 2006-229583 proposes a technique in which a portable communication terminal apparatus communicates print data to a printing apparatus while the printing apparatus wirelessly supplies power to the portable communication terminal apparatus.

In Japanese Patent Laid-Open No. 2006-229583 described above, however, transmission of print data from the portable communication terminal apparatus to the printing apparatus and wireless power supply from the printing apparatus to the portable communication terminal apparatus have a one-to-one correspondence. Even when the user transmits print data from the smartphone to the printing apparatus, he/she does not want to supply power to the smartphone in some cases. For example, when the printing apparatus executes a printing operation, relatively large power is consumed. Especially when the battery of the printing apparatus has a small remaining amount, if the printing apparatus continues transmitting power to the smartphone, the battery of the printing apparatus may run out during printing.

SUMMARY OF THE INVENTION

An embodiment of the present invention discloses an information processing apparatus, and power supply control method, which can avoid a situation in which the power of a battery on the power supply side is wastefully consumed.

According to one aspect of the present invention, there is provided an information processing apparatus for controlling a communication unit configured to perform short distance wireless communication and a power reception unit configured to receive wirelessly transmitted power, comprising: a providing unit configured to provide a user interface for prompting a user to designate a function which an external apparatus is to be instructed, via the communication unit, to execute; and a control unit configured to control power reception by the power reception unit based on the function designated through the user interface.

Also, according to another aspect of the present invention, there is provided an information processing apparatus for controlling a communication unit configured to perform short distance wireless communication and a power transmission unit configured to wirelessly transmit power, comprising: a control unit configured to control power transmission by the power transmission unit based on a function which is instructed to be executed by information received from an external apparatus via the communication unit.

Also, according to another aspect of the present invention, there is provided a power supply control method for an information processing apparatus which controls a communication unit configured to perform short distance wireless communication and a power reception unit configured to receive wirelessly transmitted power, the method comprising: a providing step of providing a user interface for prompting a user to designate a function which an external apparatus is to be instructed, via the communication unit, to execute; and a control step of controlling power reception by the power reception unit based on the function designated through the user interface.

Further features of the present invention will become apparent from the following description of exemplary embodiments with reference to the attached drawings.

BRIEF DESCRIPTION OF THE DRAWINGS

FIG. 12 is a flowchart illustrating processing for causing the NFC unit to operate as an initiator;

FIG. 13 is a sequence chart showing processing of performing data exchange in a passive mode;

FIG. 14 is a sequence chart showing processing of performing data exchange in an active mode;

FIGS. 19A and 19B are views showing an example of determination criteria according to the other embodiment.

DESCRIPTION OF THE EMBODIMENTS

A preferred embodiment of the present invention will be exemplarily described in detail below with reference to the accompanying drawings. Note that the relative arrangement of components, display screens, and the like set forth in the following embodiment do not intend to limit the scope of the invention to them, unless otherwise specified.

In this embodiment, a method will be explained in which no unnecessary wireless power supply is performed when data is transmitted by wireless power supply and short distance wireless communication such as NFC (Near Field Communication). Note that NFC will be used as short distance wireless communication, but another wireless communication such as Bluetooth® may be used. Furthermore, any method such as an electromagnetic induction method and resonance method may be used for wireless power supply. In this embodiment, a printing apparatus and a portable communication terminal apparatus such as a smartphone will be exemplified as information processing apparatuses which form an information processing system for implementing a wireless power supply control method. However, the present invention is not obviously limited to them.

<Basic Operation>

Figure 1:
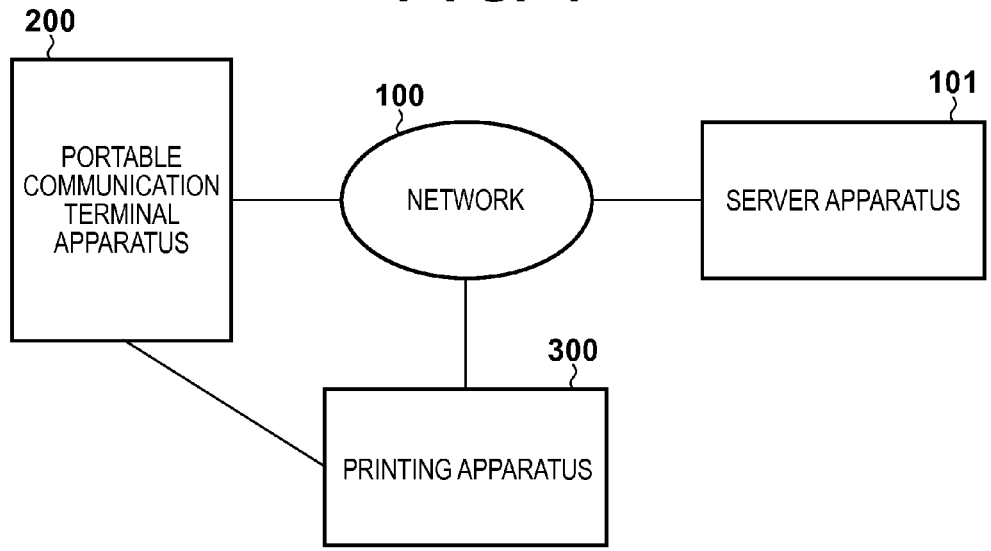
FIG. 1 is a view showing the overall configuration of a system according to an embodiment.

FIG. 1 is a view showing an example of the configuration of a wireless communication system according to this embodiment. A server apparatus 101, a portable communication terminal apparatus 200, and a printing apparatus 300 are communicably connected to each other via a network 100. The server apparatus 101 functions as a storage for image data for printing, a user ID management apparatus, an image processing application, or the like. The portable communication terminal apparatus 200 has at least a short distance wireless communication function and a power reception function for wireless power supply. In this embodiment, assume that the portable communication terminal apparatus 200 includes at least two types of wireless communication units whose authentication methods and communication speeds are different from each other. Note that the portable communication terminal apparatus 200 need only be an apparatus having a short distance wireless communication function and a power reception function for wireless power supply, for example, a personal information terminal such as a PDA (Personal Digital Assistant), a mobile phone, or a digital camera.

The printing apparatus 300 of the embodiment has a reading function of reading a document placed on a document table, and a printing function using a printing unit such as an inkjet printer, and may additionally have a FAX function and telephone function. The network 100 and the server apparatus 101 are connected via a wired LAN. The network 100 and the printing apparatus 300 are connected via a wired LAN or a wireless LAN (to be referred to as a WLAN hereinafter). The network 100 and the portable communication terminal apparatus 200 are connected via a WLAN. Since both the portable communication terminal apparatus 200 and the printing apparatus 300 have a WLAN function, they can perform peer-to-peer (to be referred to as P2P hereinafter) communication by executing mutual authentication. Note that the communication modes of the respective arrangements described above are merely examples, and the present invention is not limited to them. For example, the printing apparatus 300 and the network 100 may be connected via a WLAN.

Figure 2:
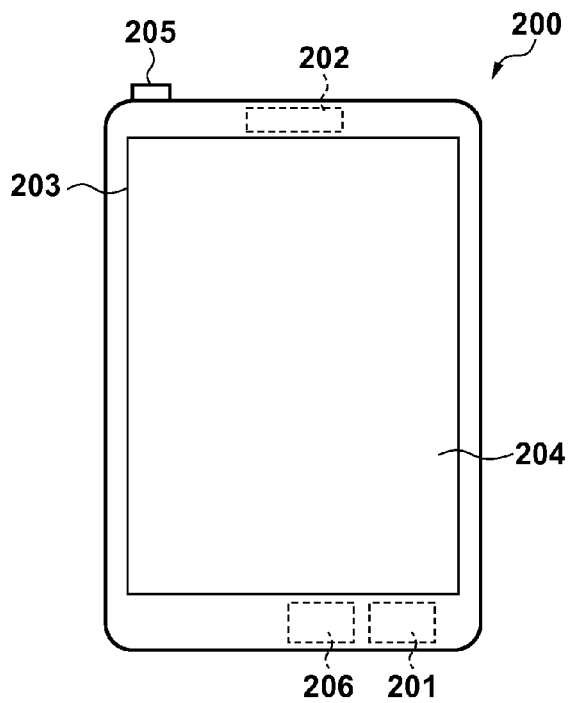
FIG. 2 is an outer appearance view showing an example of the arrangement of a portable communication terminal apparatus 200.

FIG. 2 is a view showing the outer appearance of the portable communication terminal apparatus 200. In this embodiment, a smartphone will be exemplified. The smartphone indicates a multi-function mobile phone which incorporates a camera, network browser, email function, and the like in addition to functions of a mobile phone. An NFC unit 201 performs communication using NFC. The NFC unit 201 can perform communication when it is actually moved closer to an NFC unit as a communication partner within about 10 cm. A wireless power reception unit 206 receives power from a wireless power transmission unit when it is moved closer to the wireless power transmission unit serving as a power supply source within about 10 cm. It is possible to charge a battery by power received by the wireless power reception unit 206. The wireless power reception unit 206 is arranged near the NFC unit 201 of the apparatus, thereby enabling NFC communication and wireless power reception to be simultaneously performed.

A WLAN unit 202 is a unit used to perform communication by WLAN, and is arranged within the apparatus. A display unit 203 is a display having an LCD display mechanism. An operation unit 204 includes a touch-panel operation mechanism, and detects a pressing operation by the user to output pressing information. As a representative operation method on the operation unit 204, the display unit 203 displays buttons, and when the user presses a location on the operation unit 204 where a button is displayed, thereby issuing a button pressing event. A power key 205 is used to switch between ON and OFF of the power supply.

Figure 3A:
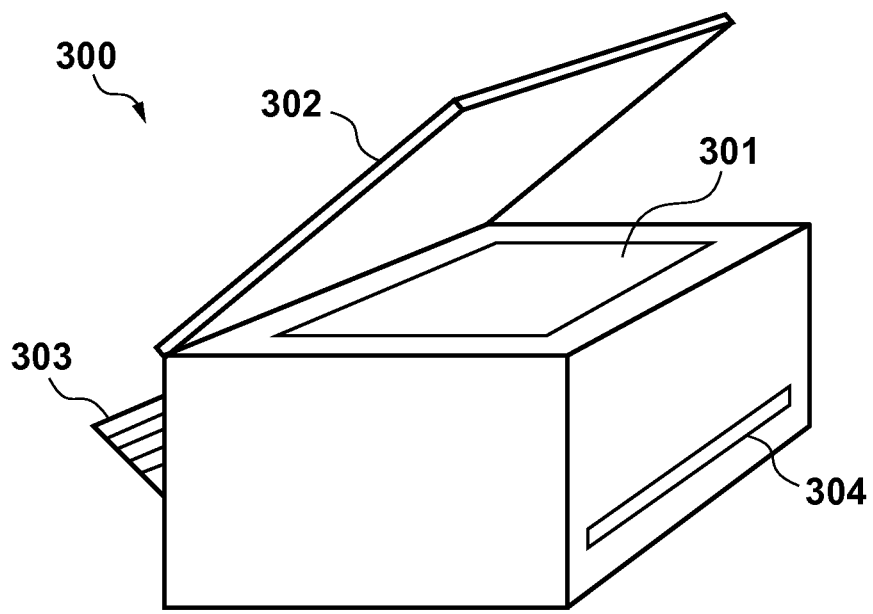
FIGS. 3A and 3B are outer appearance views showing an example of the arrangement of a printing apparatus 300.
Figure 3B:
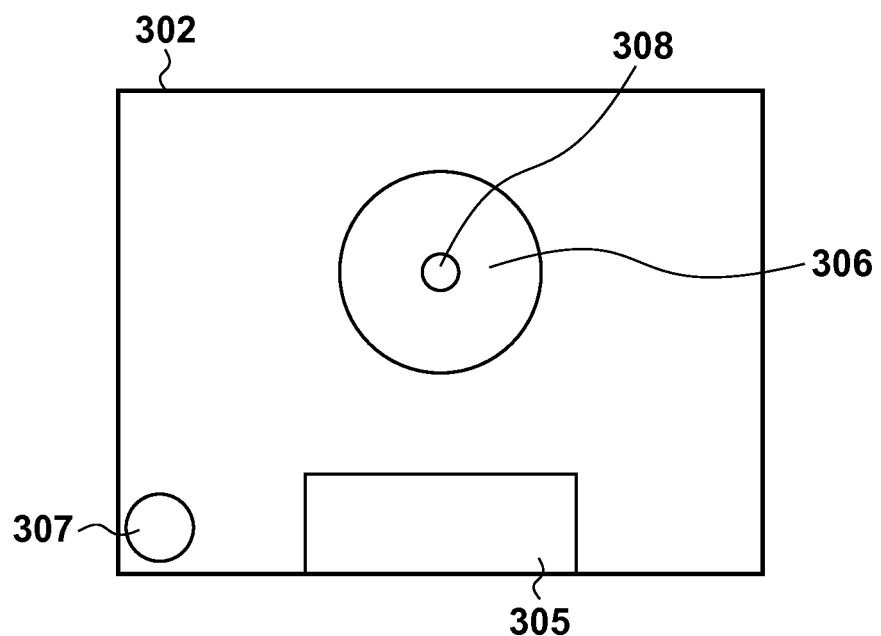

FIGS. 3A and 3B are views showing the outer appearance of the printing apparatus 300. A document table 301 is a glass-like transparent table on which a document to be read by a scanner (not shown) is placed. A document cover 302 is a cover used to prevent external leakage of reading light at the time of reading by the scanner. A printing paper insertion port 303 is an insertion port on which paper sheets of various sizes can be set. Paper sheets set on the printing paper insertion port 303 are conveyed one by one to a printing unit, and discharged from a printing paper discharge port 304 after desired printing is performed. An operation display unit 305, a wireless power transmission unit 306, and an NFC unit 308 are arranged on the upper portion of the document cover 302. The operation display unit 305 will be described later with reference to FIG. 4. The NFC unit 308 is a unit used to perform close proximity wireless communication by NFC. The wireless power transmission unit 306 can transmit power to a wireless power reception unit as a power transmission destination when the distance between the wireless power transmission unit 306 and the wireless power reception unit becomes equal to or shorter than about 10 cm. The wireless power transmission unit 306 is arranged near the NFC unit 308 within the apparatus, and configured to simultaneously perform NFC communication and wireless power reception. An antenna which is used to perform communication by WLAN is embedded in a WLAN antenna 307.

Figure 4:
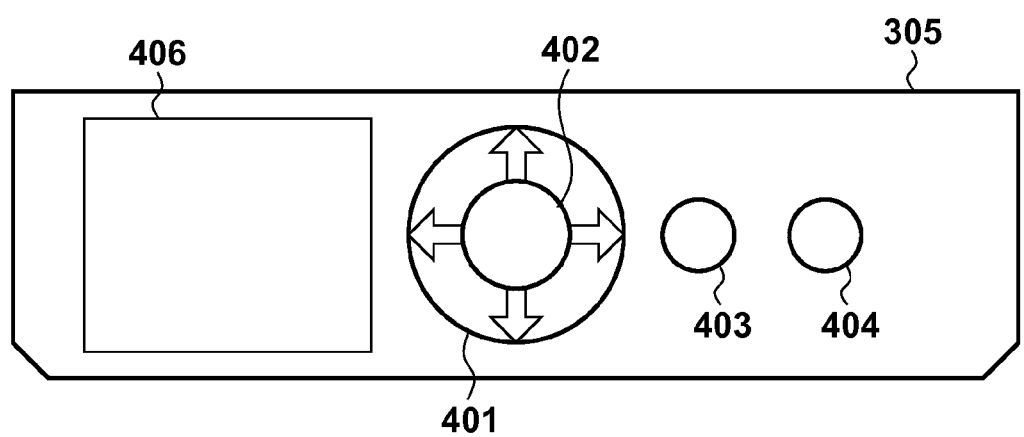
FIG. 4 is a plan view showing an operation display unit 305 of the printing apparatus.

FIG. 4 is a plan view showing the operation display unit 305. A display unit 406 is a display screen used to display images, an operation menu, and the like, and includes, for example, a dot matrix LCD. A 4-way selector 401 is used for cursor movements on the display unit, and the like. A set key 402 is a key used to input settings. A function key 403 is used for a function setting operation and the like. A start key 404 is used to execute a function such as a print/record start function.

Figure 5:
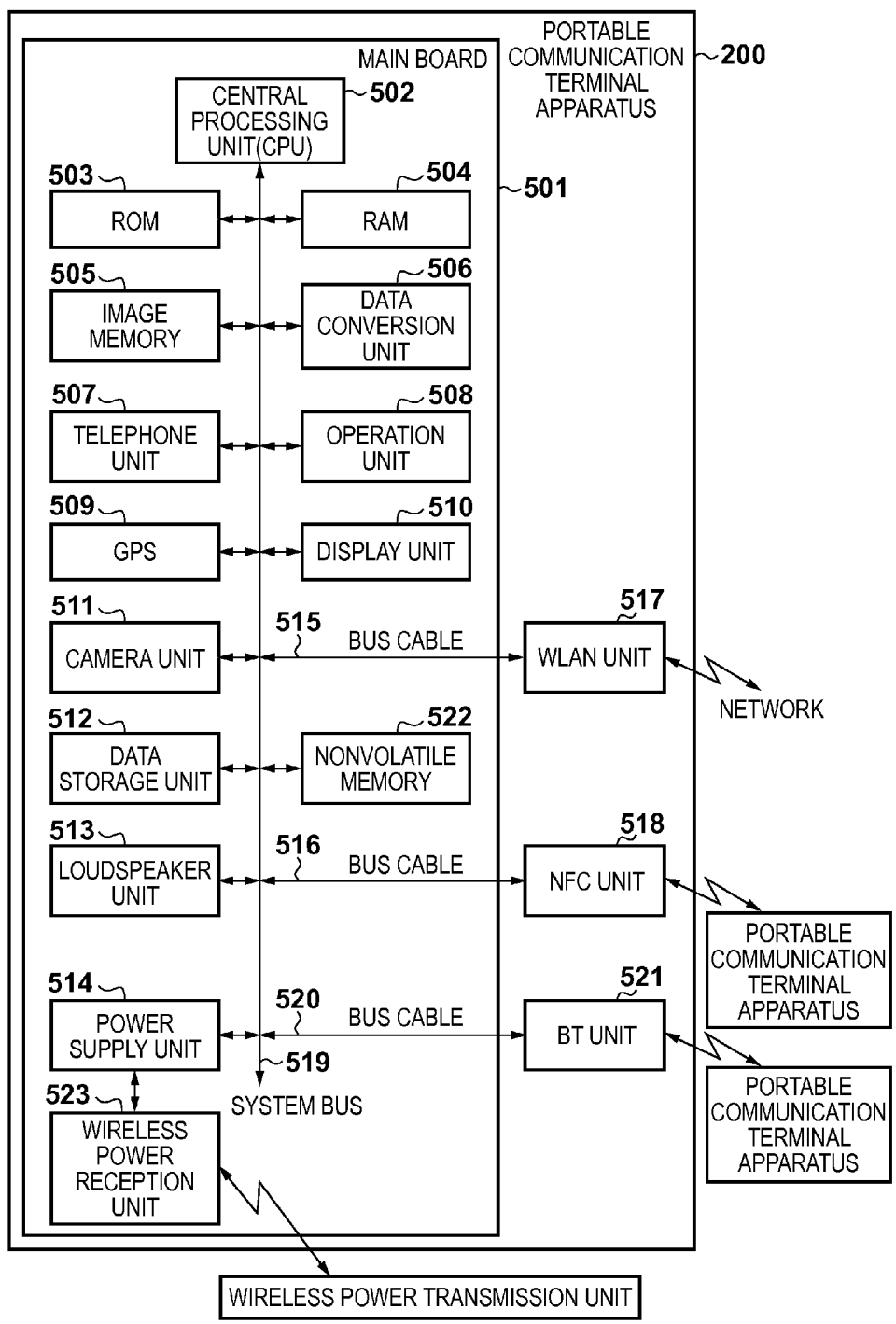
FIG. 5 is a block diagram showing an example of the arrangement of the portable communication terminal apparatus 200.

FIG. 5 is a block diagram showing the portable communication terminal apparatus 200. The portable communication terminal apparatus 200 includes a main board 501 for executing main control of the apparatus, a WLAN unit 517 for performing WLAN communication, and a communication unit for communicating with an external apparatus. The communication unit includes an NFC unit 518 for performing NFC communication, and a BT unit 521 for performing Bluetooth® communication. In the main board 501, a CPU 502 is a system control unit, and controls the overall portable communication terminal apparatus 200. A ROM 503 stores control programs to be executed by the CPU 502, an embedded operating system (OS) program, and the like. In this embodiment, the respective control programs stored in the ROM 503 execute software control such as scheduling and task switching under the management of the embedded OS stored in the ROM 503.

A RAM 504 is implemented by an SRAM (Static RAM) or the like, stores program control variables and the like, also stores setting values registered by the user, management data of the portable communication terminal apparatus 200, and the like, and is allocated with various work buffer areas. An image memory 505 is implemented by a DRAM (Dynamic RAM) or the like, and temporarily stores image data received via the communication unit and those read out from a data storage unit 512 so as to be processed by the CPU 502. A nonvolatile memory 522 is implemented by a flash memory or the like, and stores data to be saved even after power-off. The data include, for example, address book data and information about devices connected in the past. Note that the memory structure is not limited to the above-described one. For example, the image memory 505 and the RAM 504 may share a memory, or data may be backed up in the data storage unit 512. In this embodiment, a DRAM is used as the image memory 505. For example, however, a hard disk, a nonvolatile memory, or the like may be used.

A data conversion unit 506 executes analysis of a page description language (PDL) and the like, and data conversion such as color conversion and image conversion. A telephone unit 507 controls a telephone line, and implements telephone communication by processing audio data input/output via a loudspeaker unit 513. An operation unit 508 controls signals of the operation unit 204 described with reference to FIG. 2. A GPS (Global Positioning System) 509 acquires the current latitude and longitude where the portable communication terminal apparatus 200 is located, and the like. A display unit 510 electronically controls the display contents of the display unit 203 described with reference to FIG. 2, allows various input operations, and can display operation states, status conditions, and the like of the printing apparatus 300. A camera unit 511 has a function of electronically recording and encoding an image input via a lens. An image captured by the camera unit 511 is saved in the data storage unit 512. The loudspeaker unit 513 implements a function of inputting or outputting speech for a telephone function, and also an alarm notification function and the like. A power supply unit 514 is implemented by a portable battery, and controls the battery. The power supply state of the power supply unit 514 includes a battery dead state in which the battery has no remaining amount, a power-off state in which the power key 205 is not pressed, an activation state in which the apparatus is normally active, and a power saving state in which the apparatus is active but is set in a power saving mode. A wireless power reception unit 523 is connected to the power supply unit 514, and supplies, to the power supply unit 514, power received from a nearby wireless power transmission unit. The power supply unit 514 can be charged by power supplied by the wireless power reception unit 523. The wireless power reception unit 523 will be described in detail later with reference to FIG. 8.

The communication unit of the portable communication terminal apparatus 200 includes the WLAN unit 517, NFC unit 518, and BT unit 521, and can wirelessly communicate with an external apparatus in three communication modes, that is, WLAN, NFC, and Bluetooth®. The respective units of the communication unit convert data into packets to transmit the packets to another device, or converts packets from another external device into data to transmit the data to the CPU 502. The WLAN unit 517, NFC unit 518, and BT unit 521 are connected to a system bus 519 via bus cables 515, 516, and 520, respectively. The WLAN unit 517, NFC unit 518, and BT unit 521 are units each used to attain communication complying with its standard. The NFC unit will be described in detail later with reference to FIG. 7. The above respective components are connected to each other via the system bus 519 managed by the CPU 502.

Figure 6:
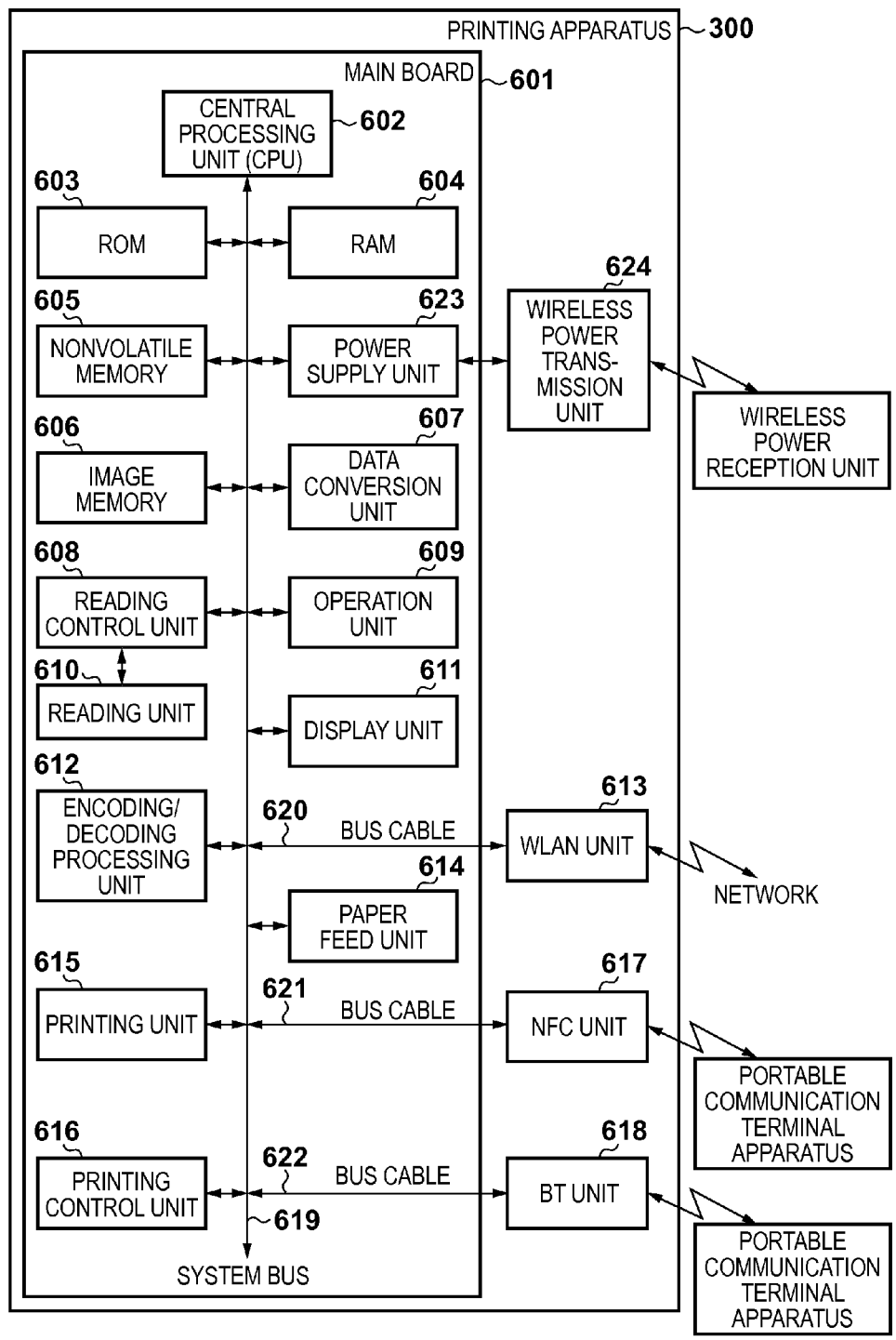
FIG. 6 is a block diagram showing an example of the arrangement of the printing apparatus 300.

FIG. 6 is a block diagram showing the schematic arrangement of the printing apparatus 300. The printing apparatus 300 includes a main board 601 for executing main control of the apparatus, and a communication unit for communicating with an external apparatus. The communication unit includes a WLAN unit 613 for performing WLAN communication, an NFC unit 617 for performing NFC communication, and a BT unit 618 for performing Bluetooth® communication. The WLAN unit 613, NFC unit 617, and BT unit 618 are connected to a system bus 619 via bus cables 620, 621, and 622, respectively. In the main board 601, a CPU 602 is a system control unit, and controls the overall printing apparatus 300. A ROM 603 stores control programs to be executed by the CPU 602, an embedded operating system (OS) program, and the like. In this embodiment, the respective control programs stored in the ROM 603 perform software control such as scheduling and task switching under the management of the embedded OS stored in the ROM 603.

A RAM 604 is implemented by an SRAM (Static RAM) or the like, stores program control variables and the like, also stores setting values registered by the user, management data of the printing apparatus 300, and the like, and is allocated with various work buffer areas. A nonvolatile memory 605 is implemented by a flash memory or the like, and stores data to be held even after power-off. More specifically, the data include network connection information and user data. An image memory 606 is implemented by a DRAM (Dynamic RAM) or the like, and stores image data received via each communication unit, those processed by an encoding/decoding processing unit 612, and the like. Also, the memory structure of the printing apparatus 300 is not limited to the above-described one, similarly to the memory structure of the portable communication terminal apparatus 200.

A data conversion unit 607 executes analysis of a page description language (PDL) and the like, conversion from image data into print data, and the like. A reading control unit 608 controls a reading unit 610 to output image data obtained by optically reading data. The reading unit 610 optically reads a document using a CIS image sensor (contact type image sensor). Furthermore, the reading unit 610 performs, via an image processing control unit (not shown), various kinds of image processing such as binarization processing and halftone processing for an image signal obtained by converting the read data into an electronic image data, thereby outputting high resolution image data. An operation unit 609 and a display unit 611 form the operation display unit 305 shown in FIG. 4, and include keys used by the user to perform operations, and an LCD used to display data. The encoding/decoding processing unit 612 executes encoding/decoding processing and enlargement/reduction processing for image data (JPEG, PNG, or the like) handled by the printing apparatus 300. A paper feed unit 614 holds paper sheets used in printing, and feeds a paper sheet to a printing unit 615 under the control of a printing control unit 616. Note that the paper feed unit 614 may be formed from a plurality of paper feed units so as to hold a plurality of types of paper sheets in one apparatus. In this case, the printing control unit 616 can control to select a paper feed unit to be used to supply paper sheets.

The printing control unit 616 performs, via the image processing control unit (not shown), various kinds of image processing such as smoothing processing, printing density correction processing, and color correction for image data to be printed, converts the image data into high resolution image data, and outputs the obtained image data to the printing unit 615. The printing unit 615 prints an image on a printing paper sheet supplied from the paper feed unit 614 in accordance with the image data supplied from the printing control unit 616. The printing control unit 616 also serves to periodically read out information of the printing unit, and update information in the RAM 604. More specifically, the printing control unit 616 updates the remaining amount of an ink tank and a printhead state. A power supply unit 623 is implemented by a portable battery or external power supply, and controls the portable battery or external power supply. The power supply state of the power supply unit 623 includes a battery dead state in which the battery has no remaining amount, a power-off state in which a power-on button is not pressed through the operation display unit 305, an activation state in which the apparatus is normally active, and a power saving state in which the apparatus is active but is set in a power saving mode. A wireless power transmission unit 624 is connected to the power supply unit 623, and can supply power to a nearby wireless power reception unit via the power supply unit 623. The wireless power reception unit will be described in detail later with reference to FIG. 8.

Figure 7:
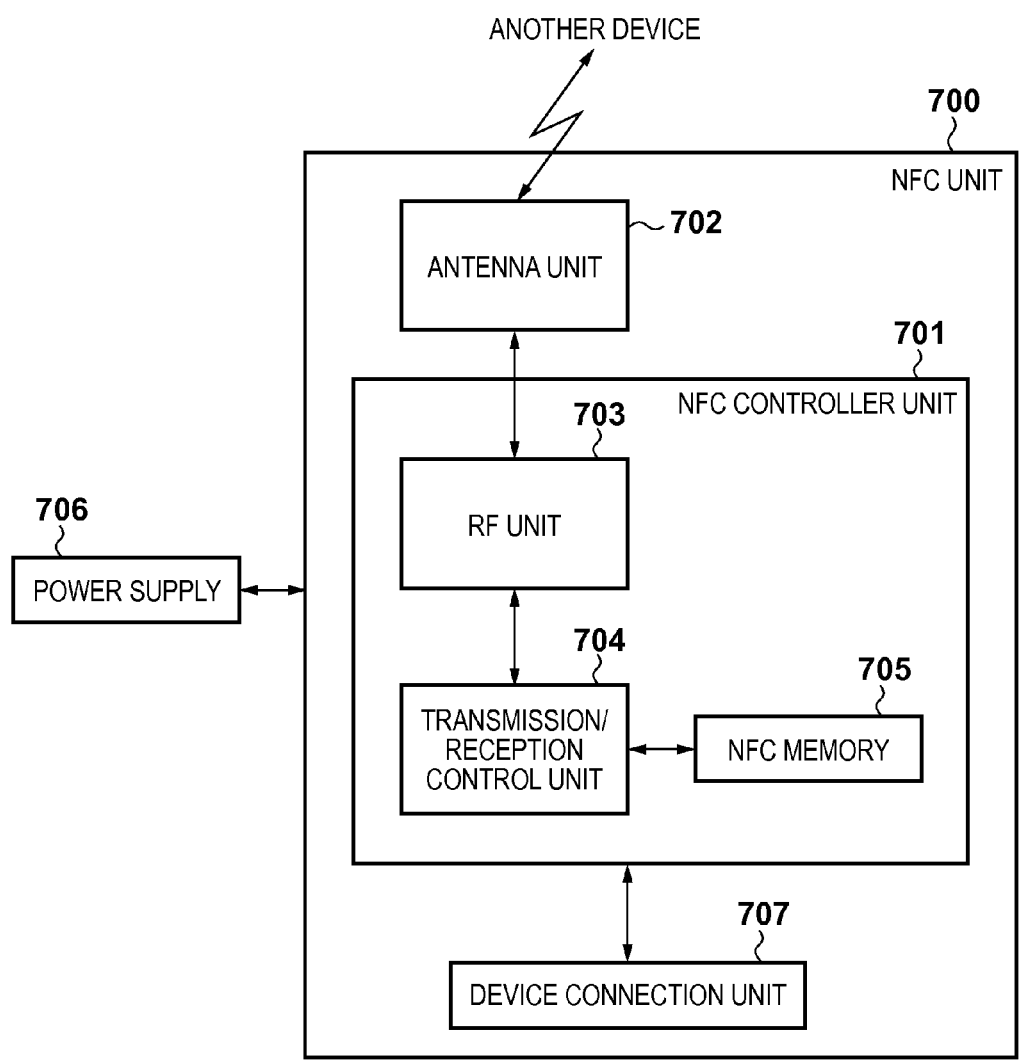
FIG. 7 is a block diagram showing an example of the arrangement of an NFC unit.

FIG. 7 is a block diagram for explaining details of the NFC units 518 and 617 used in the portable communication terminal apparatus 200 and printing apparatus 300. The NFC units 518 and 617 will be collectively called an NFC unit 700 hereinafter. Prior to a description of FIG. 7, NFC communication will be explained. An apparatus which starts communication by outputting an RF (Radio Frequency) field when performing close proximity wireless communication by an NFC unit will be referred to as an initiator. An apparatus which communicates with the initiator in response to an instruction issued by the initiator will be referred to as a target. A passive mode and active mode will now be described. The communication mode of the NFC unit includes a passive mode and active mode. In the passive mode, a target responds to an instruction of an initiator by performing load modulation. It is, therefore, unnecessary to supply power to the target. On the other hand, in the active mode, a target responds to an instruction of an initiator by an RF field generated by the target itself. It is, therefore, necessary to supply power to the target in the active mode. However, the active mode has as its feature a communication speed higher than that in the passive mode.

Referring to FIG. 7, the NFC unit 700 includes an NFC controller unit 701, an antenna unit 702, an RF unit 703, a transmission/reception control unit 704, an NFC memory 705, a power supply 706, and a device connection unit 707. The power supply unit 514 or 623 can be used as the power supply 706. The antenna unit 702 receives radio waves and carriers from another NFC device, and transmits radio waves and carriers to another NFC device. The RF unit 703 has a function of modulating/demodulating an analog signal to a digital signal. The RF unit 703 includes a synthesizer, and controls bands and channels based on frequency assignment data by identifying the frequencies of the bands and channels. The transmission/reception control unit 704 executes control associated with transmission/reception, such as assembling and disassembling of a transmission/reception frame, appending and detection of a preamble, and identification of a frame. The transmission/reception control unit 704 also controls the NFC memory 705 to read out/write various data and programs. The transmission/reception control unit 704 communicates with the system bus of the device via the device connection unit 707. When the NFC unit 700 operates in the active mode, it receives power via the power supply 706 to communicate with another NFC device located within a communicable range by carriers transmitted/received via the antenna unit 702. When the NFC unit 700 operates in the passive mode, it receives carriers from another NFC device via the antenna unit 702 to receive power from the other NFC device by electromagnetic induction. The NFC unit 700 then transmits/receives data by performing communication with the other NFC device by modulating carriers.

Figure 8:
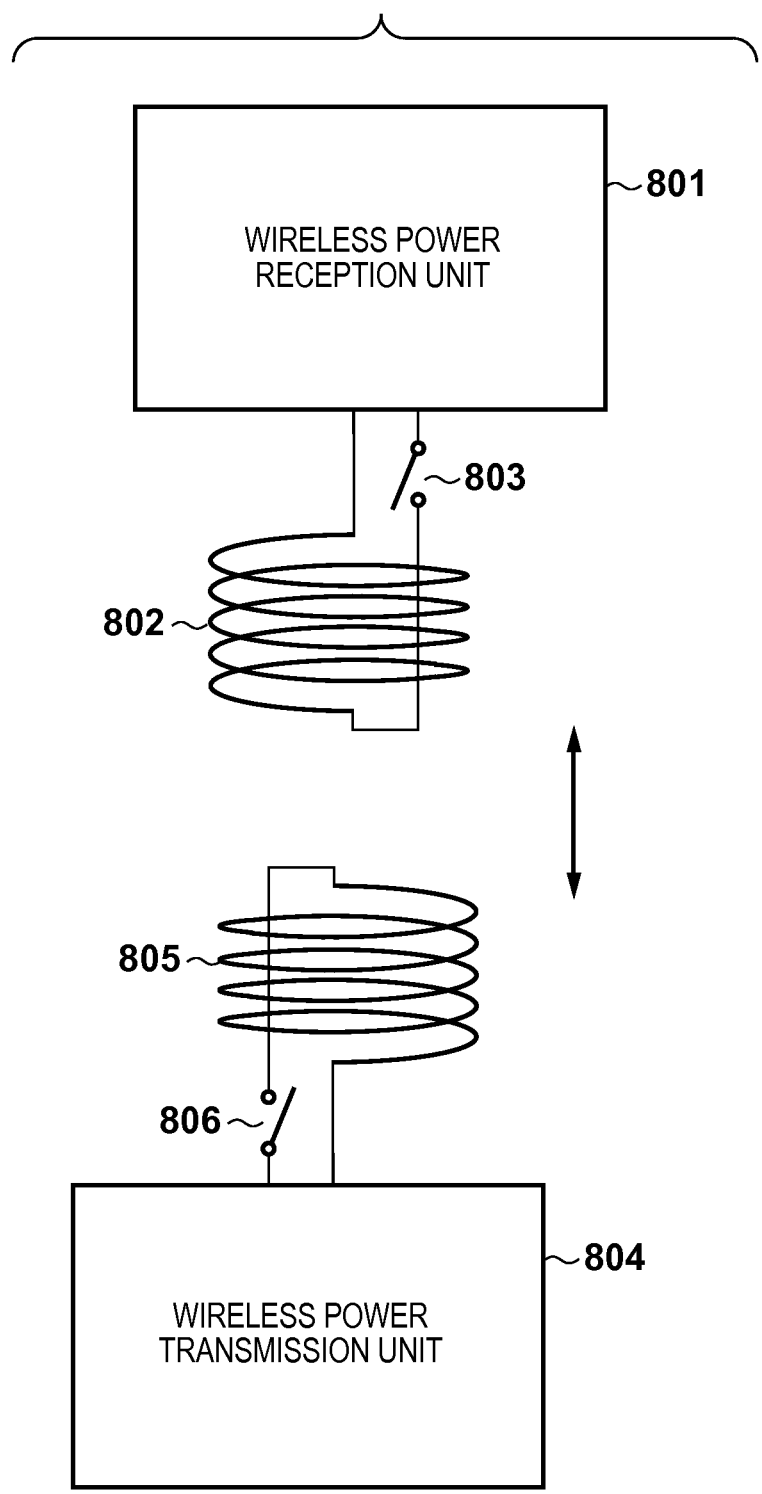
FIG. 8 is a view for explaining a wireless power supply system.

FIG. 8 is a view showing an example of the configuration of a wireless power supply system which uses a wireless power reception unit 801 and a wireless power transmission unit 804. In this system, it is possible to charge a battery connected to the wireless power reception unit 801 when the wireless power transmission unit 804 wirelessly transmits power to the wireless power reception unit 801. More specifically, the wireless power transmission unit 804 includes a resonant element 805 and a coil selection switch 806. The wireless power transmission unit 804 is connected to the battery, and generates a magnetic flux by turning on the coil selection switch 806 to cause a current to flow through the resonant element 805. The wireless power reception unit 801 includes a resonant element 802 and a coil selection switch 803. When moving the resonant element 802 of the wireless power reception unit 801 closer to the magnetic flux generated by the resonant element 805, a current is also generated in the resonant element 802 by electromagnetic induction. In this state, when the coil selection switch 803 is ON, it is possible to charge the battery connected to the wireless power reception unit 801. Although the above-described method is implemented by an electromagnetic induction method, wireless power supply according to this embodiment is not limited to this, and wireless power transmission by a magnetic resonance method or another method may be used.

Figure 9:
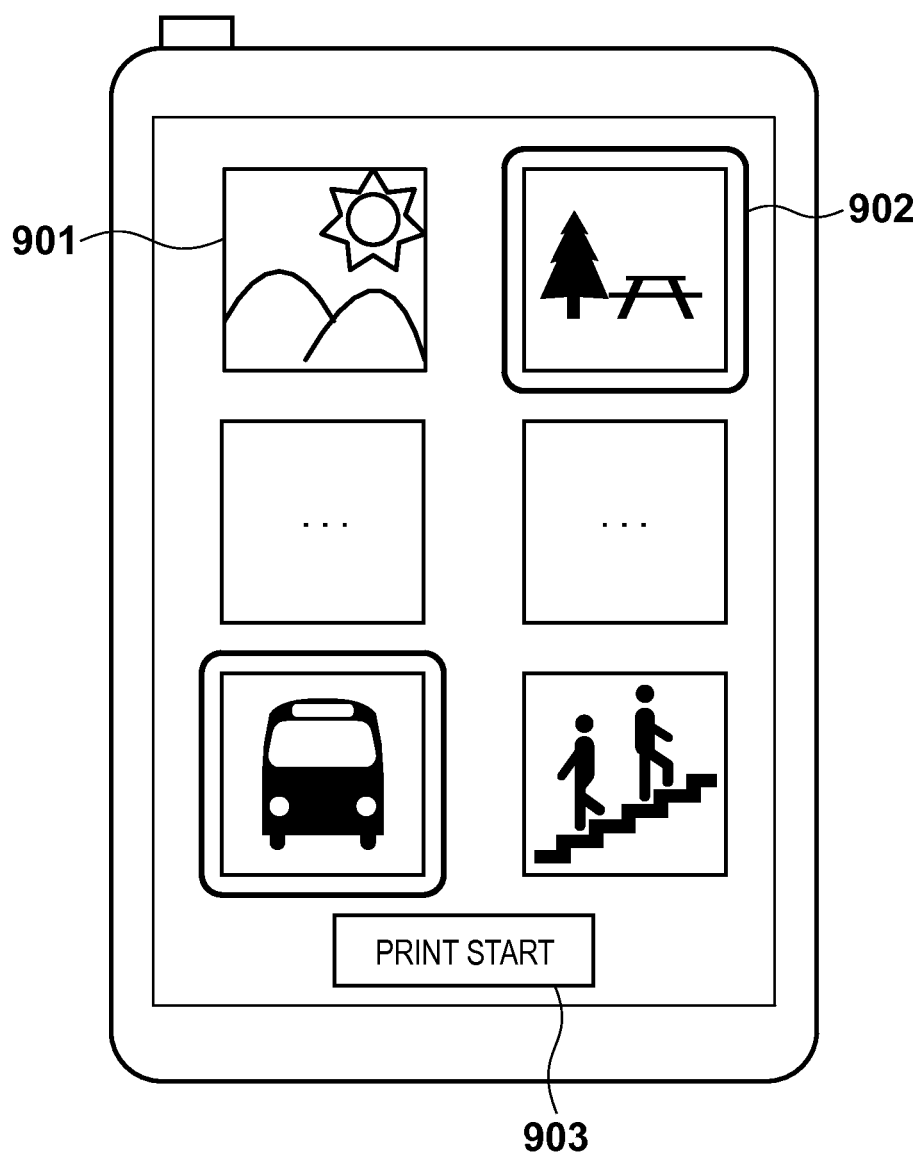
FIG. 9 is a view showing a display example on a display unit 203 of the portable communication terminal apparatus 200.

FIG. 9 is a view showing a case in which thumbnails of print candidate files are displayed on the portable communication terminal apparatus 200. Thumbnails 901 are those of files saved in the portable communication terminal apparatus 200, or those of files saved in the server apparatus 101.

When the user presses an image to be printed, a focus 902 is displayed to indicate that the image is a print target. The user can select a plurality of images to be printed, and a plurality of focuses 902 may be displayed on the display unit 203. When thumbnails cannot be displayed within one screen, they may be sequentially displayed by scrolling. After selecting a desired image to be printed, the user presses a print start key 903 to transmit a print job to the printing apparatus 300 by NFC communication. Note that a print job (image data) may be transmitted by handing over communication between the portable communication terminal apparatus 200 and the printing apparatus 300 to WLAN communication. Alternatively, the portable communication terminal apparatus 200 may transmit the address of image data held in the server apparatus 101 to the printing apparatus 300 by NFC communication, and the printing apparatus 300 may acquire the image data from the server apparatus 101.

Figure 10A:
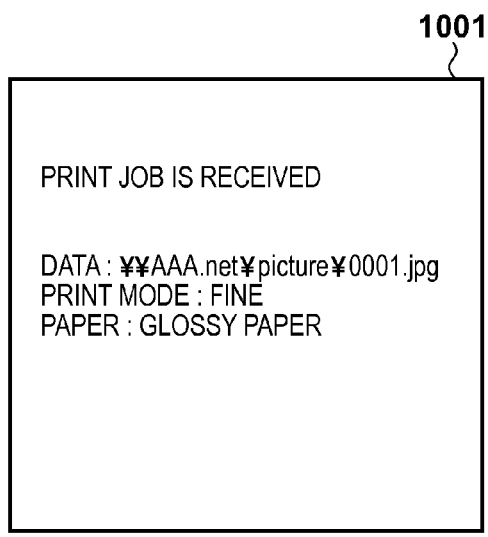
FIGS. 10A and 10B are views each showing a display example on a display unit 406 of the printing apparatus 300.
Figure 10B:
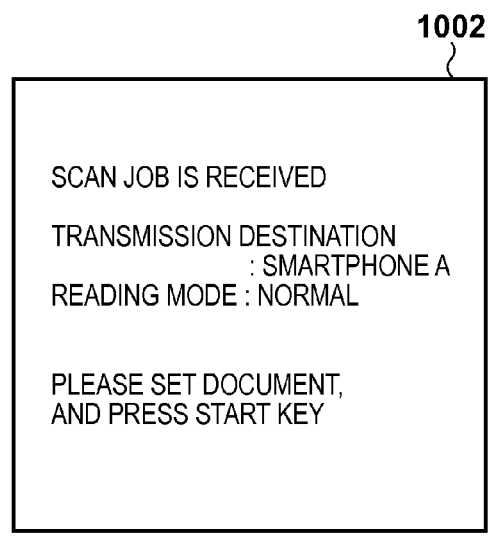

FIGS. 10A and 10B are views each showing a display example on the display unit 406 of the printing apparatus 300. When a print job is received from the portable communication terminal apparatus 200, a print job confirmation screen 1001 is displayed on the display unit 406. When a reading job (scan job) for optically reading a document placed on the document table 301 is received, a reading job confirmation screen 1002 is displayed. The scan job executes a scanning function of optically reading a document.

Figure 11A:
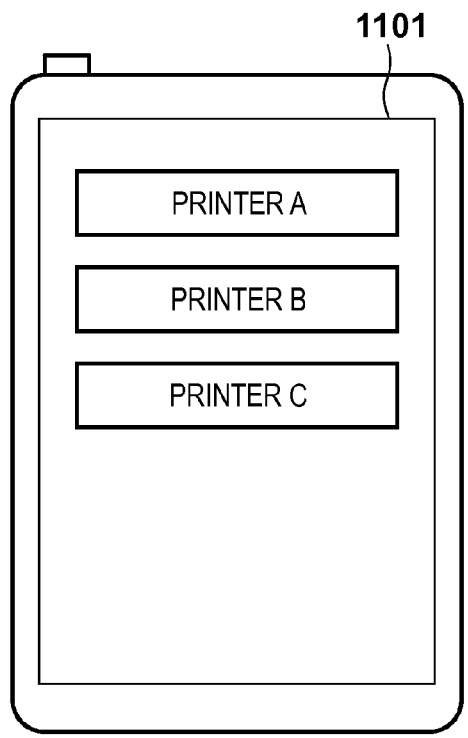
FIGS. 11A and 11B are views each showing a display example on the display unit 203 of the portable communication terminal apparatus 200.
Figure 11B:
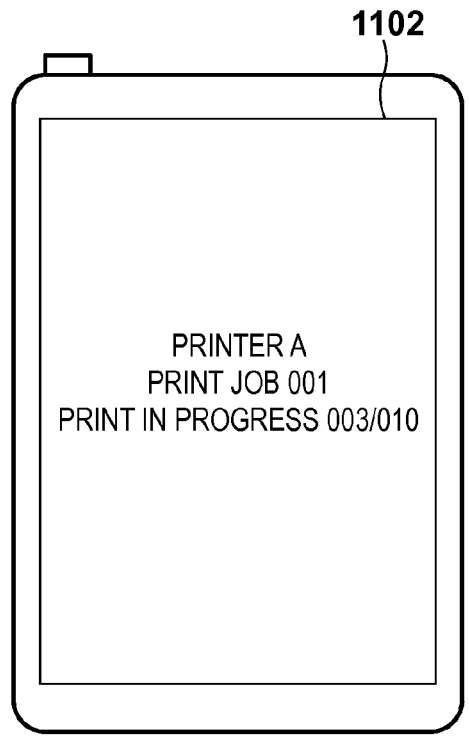

FIGS. 11A and 11B are views each showing a display example on the display unit 203 of the portable communication terminal apparatus 200. A printer selection screen 1101 is an example of a screen for selecting a printer to be used for printing. A printing state display screen 1102 is an example of a screen for displaying, in real time, the current state of the printing apparatus 300 which has submitted a print job.

FIG. 12 is a flowchart illustrating processing for causing the NFC unit 700 to operate as an initiator. In step S1201, the NFC unit 700 operates as a target and waits for an instruction from an initiator. In step S1202, the NFC unit 700 can switch to an initiator in response to a request from an application for controlling communication complying with the NFC standard. If the NFC unit 700 responds to the request to switch to an initiator, in step S1203 the application selects one of the active mode and passive mode to decide the transmission rate. In step S1204, the initiator detects the existence of an RF field output by an apparatus other than the self apparatus. If an external RF field exists, the initiator generates no self RF field. On the other hand, if no external RF field exists, the process advances to step S1205, and the initiator generates a self RF field. Through the above steps, the NFC unit starts an operation as an initiator.

FIG. 13 is a sequence chart showing a sequence of performing data exchange in the passive mode. A case will now be described in which a first NFC unit 1301 is operating as an initiator, and a second NFC unit 1302 is operating as a target. In step S1301, the first NFC unit 1301 performs single-device detection and specifies the second NFC unit 1302. In step S1302, the first NFC unit 1301 transmits the identifier of its own, the bit transmission rate of transmission/reception, the effective data length, and the like as an attribute request. The attribute request has general purpose bytes which can be arbitrarily selected and used. Upon receiving an effective attribute request, the second NFC unit 1302 transmits an attribute response in step S1303. Transmission from the second NFC unit 1302 is done by load modulation. Data transmission by load modulation is represented by a dotted arrow in FIG. 13.

After confirming an effective attribute response, the first NFC unit 1301 can change the parameters of a subsequent transmission protocol by transmitting a parameter selection request in step S1304. Parameters included in the parameter selection request are the transmission rate and the effective data length. Upon receiving an effective parameter selection request, the second NFC unit 1302 transmits a parameter selection response in step S1305, thereby changing the parameters. Note that steps S1304 and S1305 may be omitted if the parameter change is not to be performed. In step S1306, the first NFC unit 1301 and the second NFC unit 1302 exchange data by a data exchange request and a data exchange response. At the time of transmitting the data exchange request and the data exchange response, information for an application of the communication partner or the like can be transmitted as data. If the data size is large, the data can be divisionally transmitted.

Upon completion of data exchange, the process advances to step S1307, and the first NFC unit 1301 transmits one of a selection cancel request and a release request. When the first NFC unit 1301 transmits the selection cancel request, the second NFC unit 1302 transmits a selection cancel response in step S1308. Upon receiving the selection cancel response, the first NFC unit 1301 releases the attributes representing the second NFC unit 1302, and the process returns to step S1301. On the other hand, when the first NFC unit 1301 transmits the release request, the second NFC unit 1302 transmits a release response in step S1308, thereby returning to the initial state. Upon receiving the release response, the first NFC unit 1301 may return to the initial state because the target is completely released.

FIG. 14 is a sequence chart showing a sequence of performing data exchange in the active mode. A case will now be described in which a first NFC unit 1401 is operating as an initiator, and a second NFC unit 1402 is operating as a target. In step S1401, the first NFC unit 1401 transmits the identifier of its own, the bit transmission rate of transmission/reception, the effective data length, and the like as an attribute request. Upon receiving an effective attribute request, the second NFC unit 1402 transmits an attribute response in step S1402. Transmission from the second NFC unit 1402 is done by an RF field generated by itself. For this reason, the first NFC unit and the second NFC unit stop outputting the RF fields upon completion of data transmission.

After confirming an effective attribute response, the first NFC unit 1401 can change the parameters of a transmission protocol by transmitting a parameter selection request in step S1403. Parameters included in the parameter selection request are the transmission rate and the effective data length. Upon receiving an effective parameter selection request, the second NFC unit 1402 transmits a parameter selection response in step S1404, thereby changing the parameters. Note that steps S1403 and S1404 may be omitted if the parameter change is not to be performed, as in the passive mode. In step S1405, the first NFC unit 1401 and the second NFC unit 1402 exchange data by a data exchange request and a data exchange response. At the time of transmitting the data exchange request and the data exchange response, information for an application or the like can be transmitted as data. If the data size is large, the data can be divisionally transmitted.

Upon completion of data exchange, the process advances to step S1406, and the first NFC unit 1401 transmits one of a selection cancel request and a release request. When the first NFC unit 1401 transmits the selection cancel request, the second NFC unit 1402 transmits a selection cancel response in step S1407. Upon receiving the selection cancel response, the first NFC unit 1401 releases the attributes representing the second NFC unit 1402. After that, in step S1408, the first NFC unit 1401 transmits an activation request to another target whose identifier is known. Upon receiving the activation request, the target transmits an activation response in step S1409, and the process returns to step S1401. On the other hand, when the first NFC unit 1401 transmits the release request, the second NFC unit 1402 transmits a release response in step S1408, thereby returning to the initial state. Upon receiving the release response, the first NFC unit 1401 may return to the initial state because the target is completely released.

Figure 15:
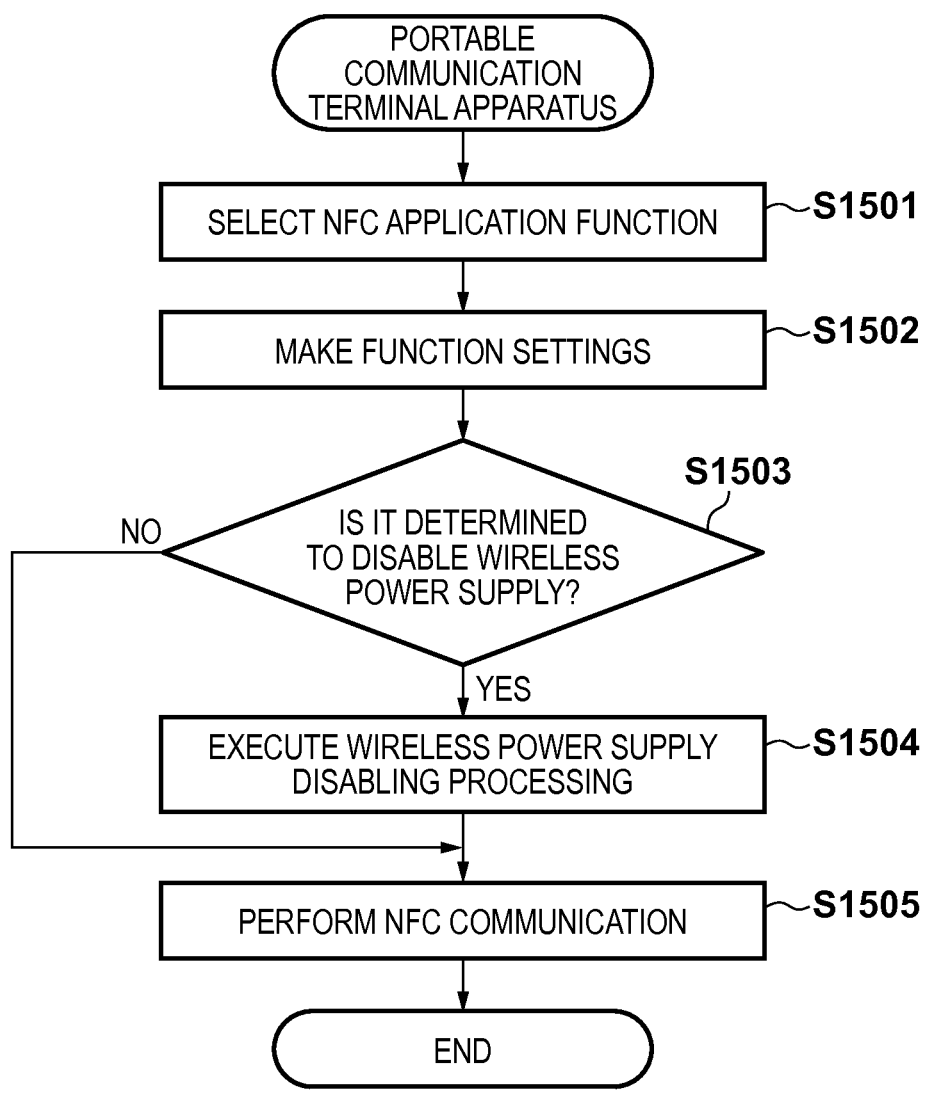
FIG. 15 is a flowchart illustrating processing of the portable communication terminal apparatus 200 according to the embodiment.
Figure 16:
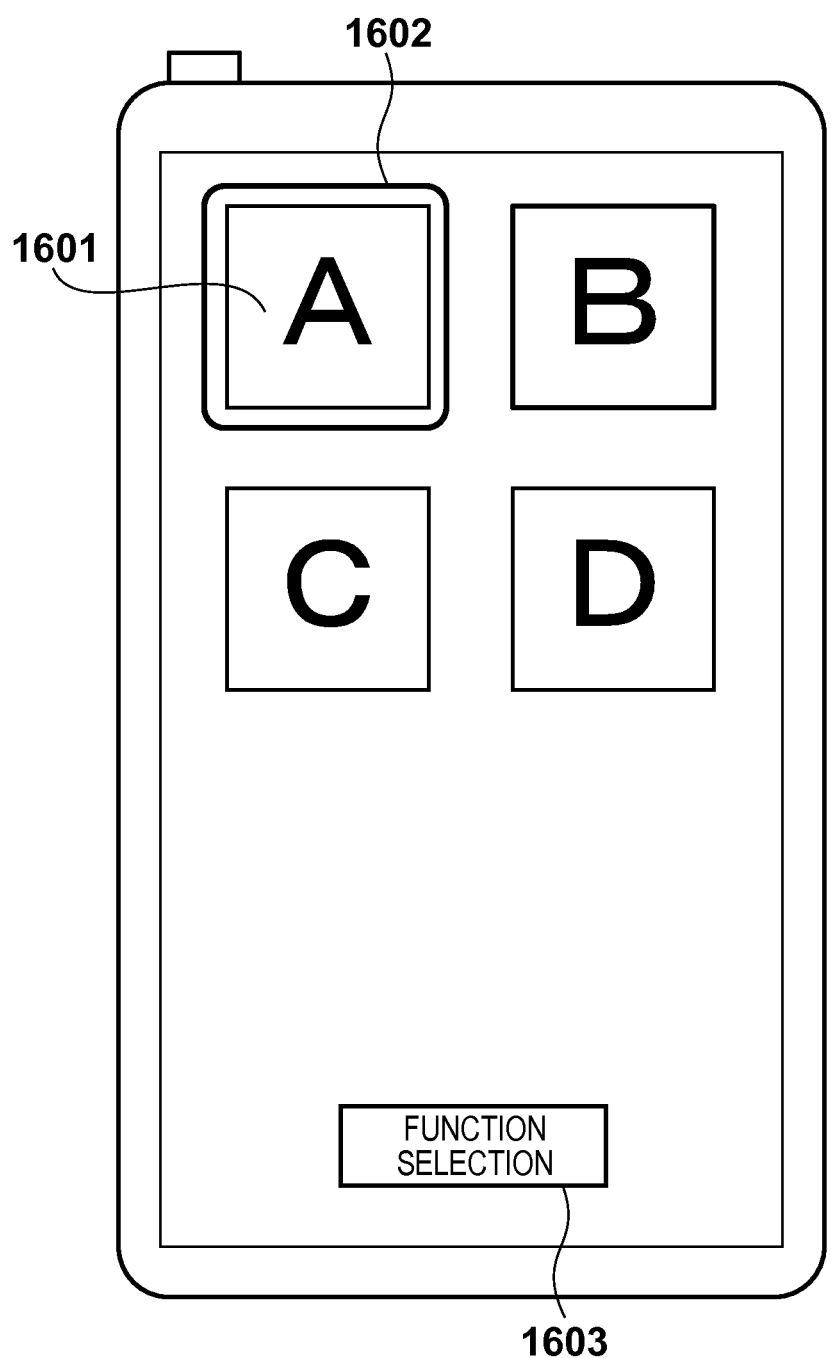
FIG. 16 is a view showing an example of an NFC application function selection screen.

FIG. 15 is a flowchart illustrating processing of selecting an NFC application function selection key on the portable communication terminal apparatus 200, and performing NFC communication with the printing apparatus 300. In step S1501, the CPU 502 of the portable communication terminal apparatus 200 displays an NFC application function selection screen on the display unit 203, and provides a user interface for prompting the user to select a desired function. FIG. 16 shows an example of the NFC application function selection screen displayed on the display unit 203 in step S1501. Note that details of the display will be described later. In step S1502, the CPU 502 makes settings associated with the function selected in step S1501. If, for example, the selected function is associated with printing, function settings are made to provide a user interface for prompting the user to select a file to be printed by displaying thumbnails of print candidate files shown in FIG. 9 on the display unit 203.

Figures 17A, 17B:
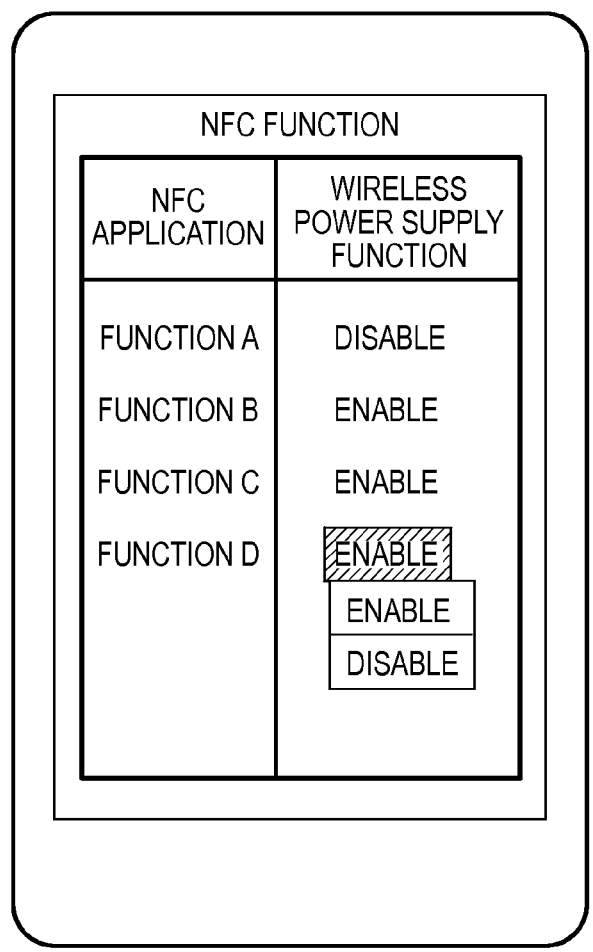
FIGS. 17A and 17B are views showing determination criteria for determining whether to disable wireless power supply.

In step S1503, in accordance with the function selected in step S1501, the CPU 502 determines whether to enable or disable wireless power supply of the portable communication terminal apparatus 200. FIGS. 17A and 17B show an example of criteria for determining whether to disable wireless power supply. Details thereof will be described later. If the CPU 502 determines to disable the wireless power supply function in step S1503, it executes wireless power supply disabling processing in step S1504. More specifically, wireless power supply is disabled by switching the coil selection switch 803 of the wireless power reception unit 801 of the portable communication terminal apparatus 200 to an OFF state under the control of the CPU 502, and the portable communication terminal apparatus 200 performs NFC communication with the printing apparatus 300, thereby transmitting a message indicating that the wireless power supply function has been disabled. Upon receiving the message, the printing apparatus 300 disables wireless power transmission by switching the wireless power transmission unit 306 of the wireless power transmission unit 804 of the printing apparatus 300 to an OFF state under the control of the CPU 602, thereby disabling wireless power supply. Finally, the CPU 502 starts NFC communication in step S1505. In the case of data exchange in the passive mode, NFC communication is performed according to the sequence chart shown in FIG. 13. On the other hand, in the case of data exchange in the active mode, NFC communication is performed according to the sequence chart shown in FIG. 14.

FIG. 16 shows an example of the screen (user interface) presented on the display unit 203 of the portable communication terminal apparatus 200 in step S1501. Some icons 1601 corresponding to a plurality of types of functions are presented on the display unit 203. When the user presses an icon to be executed, a focus 1602 is displayed to indicate that the icon is an execution target. When the user presses a function selection key 1603 while the focus 1602 is displayed, an application corresponding to the icon 1601 for which the focus 1602 is displayed is selected, thereby completing the NFC application function selection processing.

An example of the wireless power supply disabling determination method in step S1503 will be explained next. In step S1503, based on the function designated through the user interface shown in FIG. 16, the CPU 502 determines whether to enable or disable the power reception function of the wireless power reception unit 801. In this embodiment, to perform enabling/disabling determination, a table is used in which whether to enable or disable a power reception function is described for each of the plurality of types of functions selectable on the above-described user interface.

FIG. 17A shows a table 1701 to be referred to when determining based on an NFC application function whether to enable or disable the wireless power supply function. The contents of the table 1701 are obtained by storing, in association with each other, the type of a function using NFC communication and data indicating whether to enable or disable the wireless power supply function. The table 1701 is held in the ROM 503 of the portable communication terminal apparatus 200. Note that if the table 1701 is editable, it is stored in the nonvolatile memory 522 as a flash memory, as will be described later. In step S1503, the CPU 502 determines whether to disable the wireless power supply function, by referring to the table 1701 and the NFC application function selected in step S1501. If, for example, a function A is selected in step S1501, it is determined to disable the wireless power supply function in step S1503, thereby executing the wireless power supply disabling processing (step S1504).

For example, the function A includes a function in which the portable communication terminal apparatus 200 transmits a print job to the printing apparatus 300, and the printing apparatus 300 prints the received print job. Since print processing is accompanied by a mechanical operation, power consumption is high, and the battery of the printing apparatus 300 may run out. Therefore, when the function A performs NFC communication, wireless power transmission to the portable communication terminal apparatus 200 is disabled. Furthermore, a function B includes a function in which the portable communication terminal apparatus 200 transmits a cleaning instruction to the printing apparatus 300, and the printing apparatus 300 performs cleaning processing upon receiving the instruction. The cleaning processing is accompanied by a mechanical operation, similarly to the print processing. When, therefore, the function B performs NFC communication, wireless power transmission to the portable communication terminal apparatus 200 is disabled.

A function C includes a function in which the portable communication terminal apparatus 200 transmits a remaining ink amount confirmation instruction to the printing apparatus 300, and the printing apparatus 300 transmits a remaining ink amount to the portable communication terminal apparatus 200 upon receiving the instruction. The printing apparatus 300 requires no mechanical operation to confirm the remaining ink amount. Therefore, power consumption is not so high, and the power of the battery of the printing apparatus 300 is hardly consumed. When the function C performs NFC communication, wireless power transmission to the portable communication terminal apparatus 200 is enabled. A function D includes a function in which the portable communication terminal apparatus 200 transmits a print setting confirmation instruction to the printing apparatus 300, and the printing apparatus 300 transmits print settings to the portable communication terminal apparatus 200 upon receiving the instruction. The printing apparatus 300 requires no mechanical operation to confirm the print settings. When, therefore, the function D performs NFC communication, wireless power transmission to the portable communication terminal apparatus 200 is enabled.

Note that the user may be able to edit disabling/enabling of the wireless power supply function for each function in the table 1701 shown in FIG. 17A. Such edit function can be implemented when the portable communication terminal apparatus 200 provides a setting screen shown in FIG. 17B. In this setting screen, the user can set whether to enable or disable the wireless power supply function at the time of executing each NFC application function, and "enabling" or "disabling" is set in the table 1701 based on the selection result. Note that an edit operation by the user may be prohibited for a specific function. For a printing function with high power consumption, for example, only "disabling" may be selected.

With the above method, wireless power supply from the printing apparatus 300 to the portable communication terminal apparatus 200 is substantially stopped depending on the NFC application function selected in the portable communication terminal apparatus 200, thereby saving the power of the battery of the printing apparatus 300. Note that wireless power supply disabling determination may be performed by a method other than that shown in FIGS. 17A and 17B. For example, wireless power supply disabling determination is performed using, as a criterion, the presence/absence of the mechanical operation of the printing apparatus 300 in FIG. 17A. However, other criteria may be used. For example, when the portable communication terminal apparatus 200 performs billing processing for the printing apparatus 300 at the time of NFC communication, the wireless power supply function may be enabled; otherwise, the wireless power supply function may be disabled.

Alternatively, the power supply state of the printing apparatus 300 may be acquired by NFC communication, and enabling and disabling of the wireless power supply function may be switched based on the acquired power supply state. For example, if the remaining amount of the battery of the printing apparatus 300 is equal to or larger than a given threshold, the wireless power supply function may be enabled; otherwise, the wireless power supply function may be disabled. Alternatively, enabling/disabling may be determined according to whether the power supply state indicates power supply by the battery or power supply by an AC power supply. The above-described determination processing based on the billing state or power supply state may be combined with the determination criteria shown in FIG. 17A, as a matter of course. For example, the following determination processing may be performed.

If the remaining amount of the battery is smaller than a threshold, the wireless power supply function is disabled when any one of the functions shown in FIG. 17A is selected.

In the case of power supply by the AC power supply, the wireless power supply function is enabled when any one of the functions shown in FIG. 17A is selected.

Note that when communication contents of NFC communication such as the billing state or power supply state are used to set disabling/enabling of the wireless power supply function, the processes in steps S1503 and S1504 shown in FIG. 15 are desirably executed after step S1505.

According to the determination criteria shown in FIG. 17A, whether to enable or disable the wireless power supply function is determined based on the NFC application function. However, wireless power supply disabling determination may be performed for each application of the portable communication terminal apparatus 200. More specifically, since it is assumed that an application of performing print processing using NFC communication like a print application is accompanied by a mechanical operation at the time of printing, the wireless power supply function is disabled. Similarly, in an application of performing scan processing using NFC communication like a scan application, processing using a scanning function of optically reading a document is executed. Therefore, since it is assumed that a mechanical operation is performed at the time of scanning a document, the wireless power supply function is disabled. However, it may be determined to enable the wireless power supply function for an application irrelevant to the printing apparatus 300, such as an Internet browser application and email application. In either case, enabling/disabling of the wireless power supply function need only be determined based on the type of a function which the printing apparatus 300 is instructed to execute.

Note that, for example, when a printing end notification is received from the printing apparatus 300 via the NFC unit 518, the disabled wireless power supply function is enabled. Alternatively, when it is detected that the portable communication terminal apparatus 200 has been disconnected from the printing apparatus 300 since NFC communication or wireless power supply is disabled, the wireless power supply function may be returned to an enable state.

Other Embodiments

In the above embodiment, the portable communication terminal apparatus 200 on the side of instructing a function to be executed or the power reception side controls disabling of wireless power supply by determining whether to enable or disable wireless power supply. The present invention, however, is not limited to this. That is, a printing apparatus 300 on the side of receiving a function to be executed or the power transmission side may determine whether to enable or disable wireless power supply, thereby disabling wireless power supply. An arrangement will be described below in which the printing apparatus 300 controls disabling of wireless power supply by determining whether to disable wireless power supply.

Figure 18A:
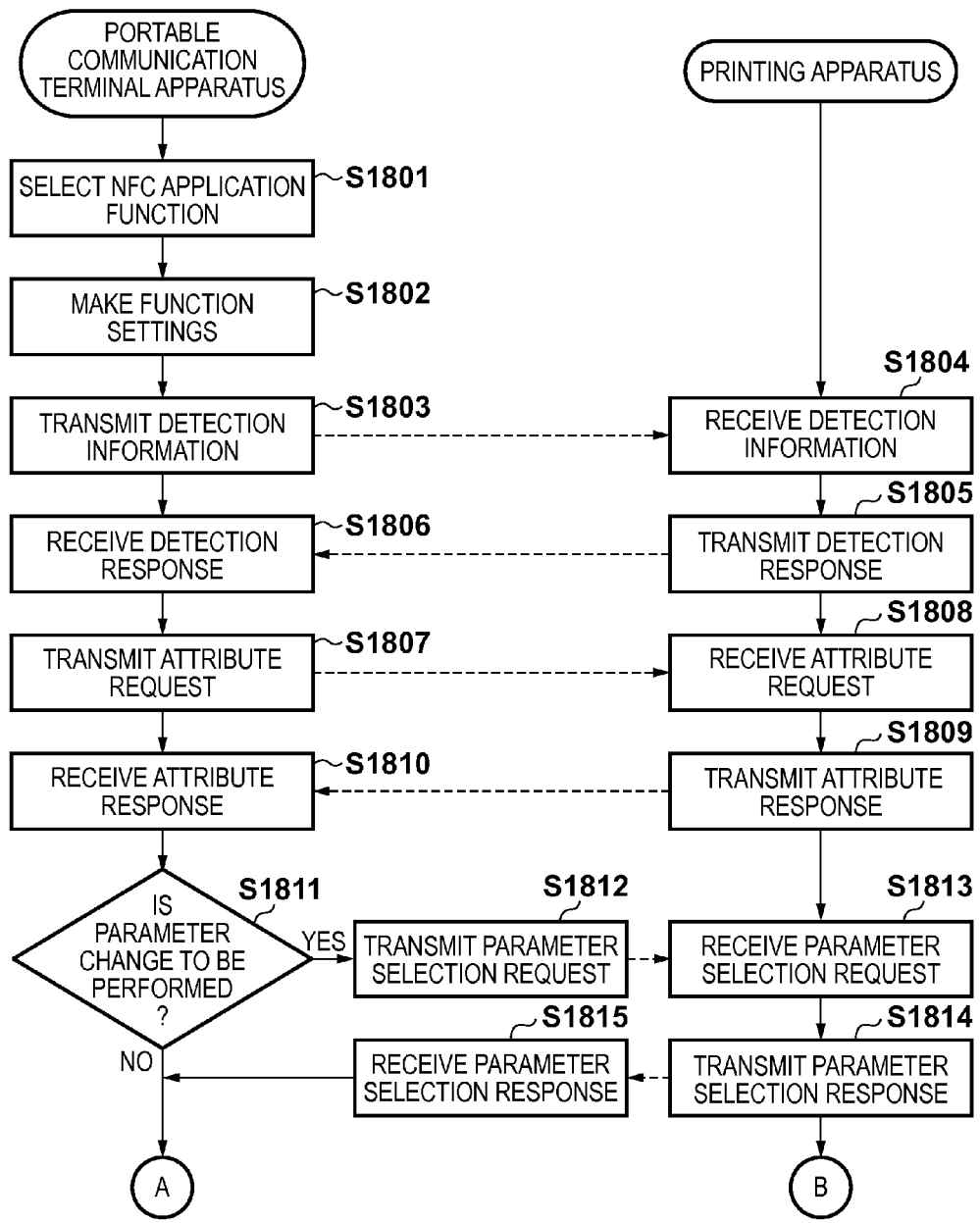
FIGS. 18A and 18B are flowcharts illustrating processing between a portable communication terminal apparatus 200 and a printing apparatus 300 according to another embodiment.
Figure 18B:
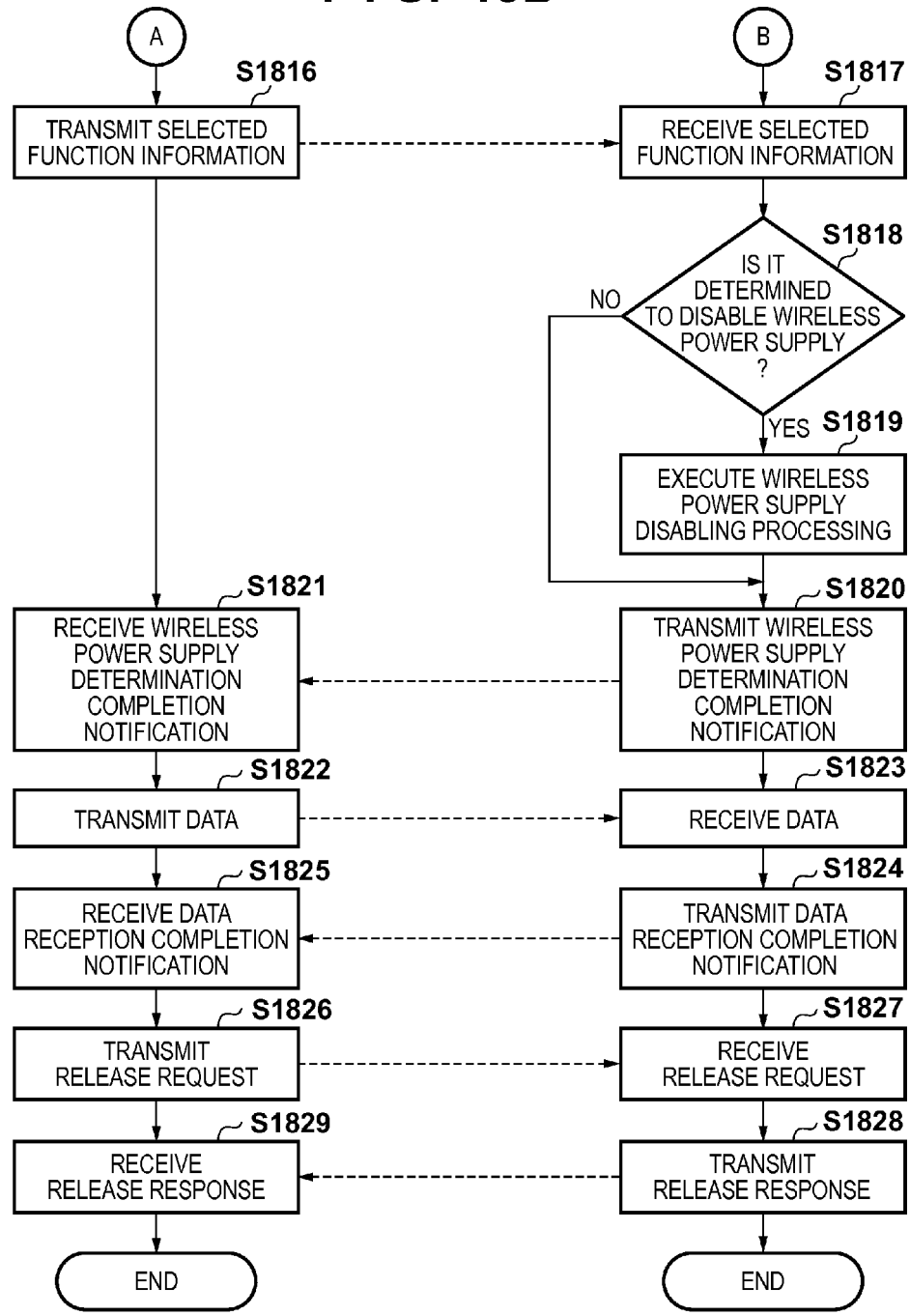

FIGS. 18A and 18B are flowcharts illustrating processing of selecting an NFC application function selection key on a portable communication terminal apparatus 200, and completing data transmission to the printing apparatus 300. Note that processes in steps S1801 and S1802 are the same as those in steps S1501 and S1502 of FIG. 15, respectively. The process advances to step S1803 using, as a trigger, NFC communication started by moving the portable communication terminal apparatus 200 closer to the printing apparatus 300. In steps S1803 to S1806, the portable communication terminal apparatus 200 and the printing apparatus 300 perform single-device detection (step S1301 of FIG. 13), and specify each other. In steps S1807 to S1810, the portable communication terminal apparatus 200 transmits an attribute request to the printing apparatus 300, and receives an attribute response from the printing apparatus 300 (steps S1302 and S1303 of FIG. 13 or steps S1401 and S1402 of FIG. 14). The attribute request includes the identifier of its own, the bit transmission rate of transmission/reception, and the effective data length, which are used for subsequent NFC communication.

Upon receiving an effective attribute response from the printing apparatus 300, a CPU 502 of the portable communication terminal apparatus 200 changes the parameters of a transmission protocol, as needed (steps S1811 to S1815). The parameter change is as described in steps S1304 and S1305 of FIG. 13 or steps S1403 and S1404 of FIG. 14. That is, the portable communication terminal apparatus 200 transmits a parameter selection request to the printing apparatus 300 (step S1812), and the printing apparatus 300 returns a parameter selection response to the portable communication terminal apparatus 200, thereby changing the parameters (steps S1813, S1814, and S1815). Parameters included in the parameter selection request are the transmission rate and the effective data length. Note that the process directly advances from step S1811 to step S1816 if the parameter change is not to be performed.

In step S1816, the portable communication terminal apparatus 200 transmits information about a selected function. Parameters to be transmitted include, for example, the ID of the function. In step S1817, the printing apparatus 300 receives the selected function information. In step S1818, a CPU 602 of the printing apparatus 300 performs wireless power supply disabling determination. FIGS. 19A and 19B show an example of a table 1901 in which wireless power supply disabling determination criteria are registered. Details thereof will be described later.

In step S1818, based on the table 1901 saved in a ROM 603 of the printing apparatus 300 and the selected function information received from the portable communication terminal apparatus 200 in step S1817, the CPU 602 determines whether to disable a wireless power supply function. The wireless power supply function of the printing apparatus 300 indicates a power transmission function using a wireless power transmission unit 804. If it is determined to disable the wireless power supply function, the CPU 602 performs wireless power supply disabling processing in step S1819. More specifically, the coil selection switch 806 of the wireless power transmission unit 804 of the printing apparatus 300 is switched to an OFF state. After that, the process advances to step S1820. If it is determined in step S1818 that the wireless power supply function is enabled, the process directly advances to step S1820. In step S1820, the CPU 602 transmits a wireless power supply determination completion notification. In step S1821, the portable communication terminal apparatus 200 receives the wireless power supply determination completion notification from the printing apparatus 300.

In steps S1822 to S1825, the portable communication terminal apparatus 200 transmits data to the printing apparatus 300. As an example, if the function selected in step S1801 is about printing, a print job is transmitted. At this time, the portable communication terminal apparatus 200 may transmit data to the printing apparatus 300 by handing over communication to WLAN communication. Upon completion of data transmission, NFC communication is released in steps S1826 to S1829. Release of NFC communication is as described in steps S1307 and S1308 of FIG. 13 or steps S1406 and S1407 of FIG. 14.

FIGS. 19A and 19B show an example of a table to be referred to when determining in step S1818 whether to disable or enable wireless power supply. FIG. 19A shows a table used to determine whether to enable or disable the wireless power supply function, in accordance with the NFC application function indicated by the selected function information received from the portable communication terminal apparatus 200. The contents of the table 1901 are obtained by storing, in association with each other, the type of the NFC application function indicated by the selected function information and information indicating whether to enable or disable the wireless power supply function. The table 1901 is held in the ROM 603 of the printing apparatus 300. Note that if the user can edit the contents of the table 1901, for example, the table 1901 is held in the nonvolatile memory 605 as a flash memory. By referring to the table 1901 using the selected function information received via NFC communication, the CPU 602 of the printing apparatus 300 determines whether to disable the wireless power supply function. Note that functions A, B, C, and D in the table are the same as those described with reference to FIG. 17A.

Note that the user may be able to edit disabling/enabling of the wireless power supply function for each function in the table 1901 on the printing apparatus 300. FIG. 19B shows an example of the setting screen of the printing apparatus 300, which is used by the user to set whether to enable or disable the wireless power supply function at the time of executing the NFC application function indicated by the selected function information. Wireless power supply disabling determination is performed based on the selection result in the printing apparatus 300. With the above-described method, the NFC application function selected in the portable communication terminal apparatus 200 executes no wireless power supply from the printing apparatus 300 to the portable communication terminal apparatus 200, thereby saving the power of the battery of the printing apparatus 300.

Note that wireless power supply disabling determination may be performed by a method other than that shown in FIGS. 19A and 19B. For example, such determination may be performed in consideration of the billing state or power supply state (the remaining battery amount, whether power is supplied by a battery or AC power supply) of the printing apparatus 300.

Note that the disabled wireless power supply function need only be enabled upon completion of a printing operation in the printing apparatus 300 or upon completion of reading and scanning of a document. Alternatively, when it is detected that the printing apparatus 300 has been disconnected from the portable communication terminal apparatus 200 since NFC communication or wireless power supply is disabled, the wireless power supply function may be returned to an enable state.

In the above description, enabling/disabling of power reception or power transmission is determined based on a function instructed by the user. The present invention, however, is not limited to this. For example, the amount of power to be received or transmitted may be adjusted based on a function instructed by the user. If, for example, a power transmission side apparatus executes a function with large power consumption, the amount of power to be transmitted to a power reception side apparatus is made smaller than that of a function with small power consumption.

The portable communication terminal apparatus according to each of the above embodiments may be any of various apparatuses such as a smartphone, a mobile phone, a tablet, and a note PC. The apparatus is not limited to a portable apparatus, and may be an apparatus installed at a predetermined installation position, or an apparatus which also receives power from an AC power supply.

Furthermore, instead of the printing apparatus according to each of the above embodiments, any of various apparatuses such as a PC, a scanner for reading a document, a camera, and a power supply apparatus for performing wireless power supply may be adopted.

Moreover, in the above embodiments, a case in which the portable communication terminal apparatus or printing apparatus has an arrangement for wireless power supply or wireless power reception and an arrangement for performing various kinds of wireless communication has been explained. The present invention, however, is not limited to this. For example, these arrangements may be connected to the above apparatus, and controlled by the apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137485, filed Jun. 28, 2013, which is hereby incorporated by reference herein in its entirety.

What is claimed is:

1. An information processing apparatus for controlling a communication unit configured to perform short distance wireless communication and a power reception unit configured to receive wirelessly transmitted power, comprising:
a providing unit configured to provide a user interface for prompting a user to designate a function which an external apparatus is to be instructed, via the communication unit, to execute; and
a control unit configured to control power reception by the power reception unit based on the function designated through the user interface.

2. The apparatus according to claim 1, wherein the user interface presents a plurality of types of functions which the external apparatus is to be instructed to execute, and prompts the user to select at least one of the plurality of types of functions.

3. The apparatus according to claim 2, further comprising a table in which information for specifying a function which enables the power reception unit or a function which disables the power reception unit among the plurality of types of functions is described and which is referred to by said control unit.

4. The apparatus according to claim 2, further comprising an edit unit configured to cause the user to edit a function which enables the power reception unit or a function which disables the power reception unit among the plurality of types of functions.

5. The apparatus according to claim 1, wherein when the designated function is accompanied by a mechanical operation in the external apparatus, said control unit determines to disable a power reception function using the power reception unit.

6. The apparatus according to claim 5, wherein the function accompanied by the mechanical operation includes at least one of a printing function and a scanning function of reading a document.

7. The apparatus according to claim 1, further comprising a unit configured to acquire a power supply state of the external apparatus by communication using the communication unit,
wherein based on the acquired power supply state, said control unit further determines whether to enable a power reception function using the power reception unit.

8. The apparatus according to claim 1, further comprising a unit configured to acquire a billing state by communication using the communication unit,
wherein based on the acquired billing state, said control unit further determines whether to enable a power reception function using the power reception unit.

9. An information processing apparatus for controlling a communication unit configured to perform short distance wireless communication and a power transmission unit configured to wirelessly transmit power, comprising:
a control unit configured to control power transmission by the power transmission unit based on a function which is instructed to be executed by information received from an external apparatus via the communication unit.

10. The apparatus according to claim 9, further comprising
a table in which information for specifying, in said information processing apparatus, a function which enables the power transmission unit or a function which disables the power transmission unit is described and which is referred to by said control unit.

11. The apparatus according to claim 10, further comprising
an edit unit configured to cause a user to edit a function which enables the power transmission unit or a function which disables the power transmission unit, which is described in said table.

12. A power supply control method for an information processing apparatus which controls a communication unit configured to perform short distance wireless communication and a power reception unit configured to receive wirelessly transmitted power, the method comprising:
a providing step of providing a user interface for prompting a user to designate a function which an external apparatus is to be instructed, via the communication unit, to execute; and
a control step of controlling power reception by the power reception unit based on the function designated through the user interface.

13. A storage medium storing a program for causing a computer to execute a power supply control method according to claim 12.

* * * * *